(12) United States Patent
Atake et al.

(10) Patent No.: US 6,416,866 B1
(45) Date of Patent: Jul. 9, 2002

(54) MOLDED ARTICLE AND SURFACE COVERING SHEET THEREFOR

(75) Inventors: Hiroyuki Atake; Hajime Takeuchi, both of Tokyo-To (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 09/424,716

(22) PCT Filed: Mar. 30, 1999

(86) PCT No.: PCT/JP99/01627

§ 371 (c)(1),
(2), (4) Date: Nov. 29, 1999

(87) PCT Pub. No.: WO99/50065

PCT Pub. Date: Oct. 7, 1999

(30) Foreign Application Priority Data

| Mar. 30, 1998 | (JP) | 10-099832 |
| Jul. 29, 1998 | (JP) | 10-213673 |
| Jul. 31, 1998 | (JP) | 10-216715 |

(51) Int. Cl.$^7$ ............................................. B32B 27/40
(52) U.S. Cl. ............... 428/424.8; 428/423.1; 428/424.2; 428/515; 428/522
(58) Field of Search ..................... 428/411.1, 413, 428/414, 423.1, 424.2, 424.8, 500, 515, 522

(56) References Cited

U.S. PATENT DOCUMENTS

| 4,804,584 A | 2/1989 | Nakashima et al. ..... 428/424.2 |
| 4,902,557 A | 2/1990 | Rohrbacher .................. 428/215 |
| 5,198,485 A | * 3/1993 | King et al. .................. 524/243 |
| 5,412,000 A | * 5/1995 | Hellmann et al. .......... 523/437 |

FOREIGN PATENT DOCUMENTS

| JP | 63-272547 | 11/1988 |
| JP | 02-180676 | 7/1990 |
| JP | 03-146164 | 6/1991 |
| JP | 03-146165 | 6/1991 |
| JP | 3-150156 | 6/1991 |
| JP | 3-502432 | 6/1991 |
| JP | 07-032401 | 2/1995 |

OTHER PUBLICATIONS

Alger, Mark; Polymer Science Dictionary, 2nd edition, Chapman &Hall, 1997, pp. 6–7.*

* cited by examiner

Primary Examiner—Paul Thibodeau
Assistant Examiner—Christopher Paulraj
(74) Attorney, Agent, or Firm—Parkhurst & Wendel LLP

(57) ABSTRACT

There is provided a molded product comprising: a molded substrate comprising a polyolefin resin and an ethylene-propylene rubber; a chlorinated polyolefin resin layer laminated onto the molded substrate, the chlorinated polyolefin resin layer being in contact with the molded substrate; and a surface layer of a thermoplastic resin layer laminated as an outermost layer onto the chlorinated polyolefin resin layer either directly or through other layer(s).

4 Claims, 2 Drawing Sheets

MOLDED ARTICLE AND SURFACE
COVERING SHEET THEREFOR

TECHNICAL FIELD

The present invention relates to a plastic molded product having a surface layer for decoration or surface modification purposes, and more particularly to a molded product comprising a molded substrate of a polyolefin material and, provided thereon, a surface layer of a thermoplastic resin, such as an acrylic resin, wherein the surface layer is firmly adhered to the molded substrate.

BACKGROUND ART

Molded products produced by various molding methods including injection molding have hitherto been used in various applications. As molding materials, various resins, such as polypropylene resin and ABS, have been used according to applications. Further, a variety of molded products having a decorative design, which is provided by forming patterns, letters or the like on the surface of the molded products by printing or other methods, have also been used. In the production of molded products having a design of letters, patterns or the like, the surface on which the design is to be provided is often not flat. In this case, the so-called "curved surface printing technique" such as pad printing, and hydraulic transfer, may be used. Further, according to the simultaneous injection molding/lamination method, the production of a molded product and the formation of letters, patterns or the like on the surface of the molded product can be simultaneously carried out in one step.

Regarding molding materials, inexpensive polyolefin resins, such as polypropylene resin, are suitable from the viewpoint of cost and the like. Polyolefin resins, however, are poor in adhesion to other resins. This makes it difficult to provide letters, patterns or the like on the surface of molded products of polyolefins. Further, in general, polyolefin resins are soft and are poor in surface strength properties, such as scratch resistance. Therefore, as-molded products of polyolefin resins cannot be used in applications where a hard surface is required. Various attempts have been made to effectively decorate or modify the surface of the molded products of polyolefin resins, e.g. for the purpose of enhancing the surface hardness, so that the polyolefin molded products can be utilized in wider applications.

For example, there is known a method ① in which a surface coating is applied onto a polyolefin molded product. This method can effect a surface modification of a molded product to improve the surface strength, etc. However, it is not possible with this method to decorate a molded product by providing letters, patterns or the like on the surface thereof.

Also known is a method ② in which a primer is coated on the surface of a molded product to improve its adhesiveness, followed by decoration of the surface by the hydraulic transfer method. Though this method can provide a molded product with letters, patterns or the like, the letters or the like are likely to be undesirably distorted. Further, this method necessitates two coating steps, i.e., the primer coating and a top coating after hydraulic transfer of a paint, leading to low production efficiency and high cost.

Further, in methods ① and ②, a coating composition having good adhesion to the polyolefin resin should be selected.

There is also known a method ③ in which simultaneously with molding of a polyolefin resin, a surface cover sheet, such as a decorative sheet, is laminated onto the as-molded product (simultaneous injection molding/lamination method). In this method, use of a surface cover sheet with a polyolefin resin sheet laminated onto the backside thereof can offer improved adhesion, and will provide a molded product with a surface cover sheet firmly laminated onto the molded substrate. However, the step of laminating a polyolefin resin sheet onto the backside of a surface cover sheet will increase the production cost. Further, the presence of the polyolefin resin sheet in the surface cover sheet will enhance the breaking strength at room temperature. This makes it difficult to cut the sheet at the time of trimming of excess sheet after the lamination step.

Accordingly, it is an object of the present invention to provide a molded product which utilizes an inexpensive polyolefin-based material as a molding material and which has a cover layer for surface modification, decoration or other purposes, which cover layer is firmly adhered to the molded substrate.

DISCLOSURE OF THE INVENTION

The above object of the present invention can be attained by a molded product comprising: a molded substrate comprising a polyolefin resin and an ethylene-propylene rubber; a chlorinated polyolefin resin layer laminated onto the molded substrate, the chlorinated polyolefin resin layer being in contact with the molded substrate; and a surface layer of a thermoplastic resin laminated as an outermost layer onto the chlorinated polyolefin resin layer either directly or through other layer(s). According to this molded product, by virtue of the ethylene-propylene rubber contained in the molded substrate and of the chlorinated polyolefin resin layer laminated in contact with the molded substrate, the surface layer is laminated with good adhesion onto the molded substrate.

In the above molded product, when the surface layer is formed of an acrylic resin, a urethane resin layer may be provided between the surface layer and the chlorinated polyolefin resin layer such that it contacts at least with the chlorinated polyolefin resin layer, whereby the adhesion between the surface layer and the chlorinated polyolefin resin layer can be improved.

BEST MODE FOR CARRYING OUT THE INVENTION

Embodiments of the molded product according to the present invention will be described with reference to the accompanying drawings.

[General description]

Figure 1:
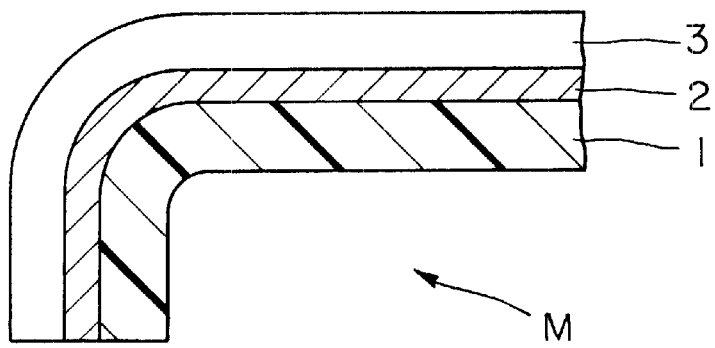
FIG. 1 is a cross-sectional view showing one embodiment of the molded product according to the present invention.
Figure 2:
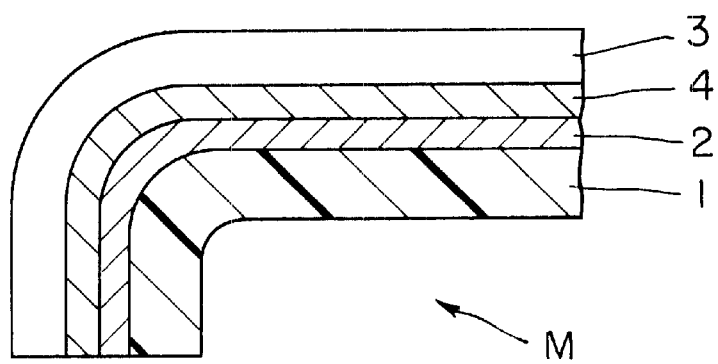
FIG. 2 is a cross-sectional view showing another embodiment of the molded product according to the present invention.
Figure 3:
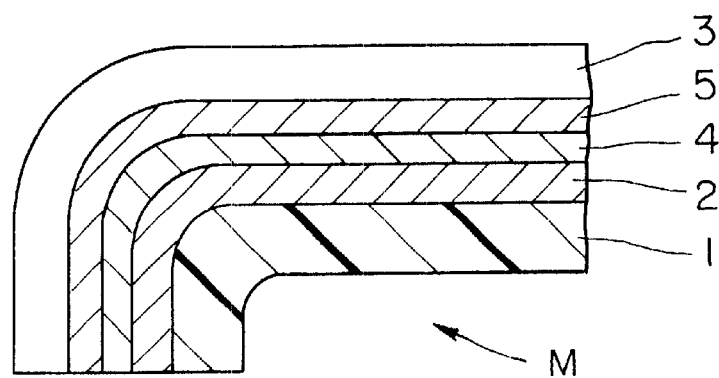
FIG. 3 is a cross-sectional view showing a further embodiment of the molded product according to the present invention.

FIG. 1 is a cross-sectional view showing a fundamental embodiment of the molded product according to the present invention, and FIGS. 2 and 3 are cross-sectional views showing other embodiments of the molded product according to the present invention.

A molded product M according to the fundamental embodiment shown in FIG. 1 comprises a molded substrate 1 comprising a polyolefin resin and an ethylene-propylene rubber, a chlorinated polyolefin resin layer 2 laminated onto and in contact with the substrate 1, and a surface layer 3 of a thermoplastic resin as the outermost layer laminated directly onto the chlorinated polyolefin resin layer 2. The surface layer 3 is a layer provided for surface modification, surface decoration or other purposes. According to this molded product, the molded substrate 1 is thus composed of a material containing two components of a polyolefin resin and an ethylene-propylene rubber rather than a polyolefin resin alone, the chlorinated polyolefin resin layer 2 is provided as an adhesive layer onto the molded resin substrate 1, and the surface layer 3 is laminated onto the chlorinated polyolefin resin layer 2. Owing to these features, the molded product has the advantage that the surface layer for surface modification, surface decoration and other purposes can be laminated onto the molded substrate with good adhesion between the surface layer and the substrate.

Molded products M shown in FIGS. 2 and 3 represent embodiments where the surface layer is formed of an acrylic resin, and a urethane resin layer 4 is provided between the chlorinated polyolefin resin layer 2 and the surface layer 3, the layer 4 being in contact with layer 2 in the both embodiments. More specifically, the molded product M shown in FIG. 2 comprises the molded substrate 1, the chlorinated polyolefin resin layer 2, the urethane resin layer 4, and the surface layer 3 laminated in that order, and the molded product M shown in FIG. 3 has the same construction as the molded product M shown in FIG. 2, except that a decorative layer 5 of letters, patterns or the like formed with an ink or coating liquid using an acrylic resin as a binder is interposed between the urethane resin layer 4 and the surface layer 3. Thus, in either embodiment, the chlorinated polyolefin resin layer 2 is interposed between the surface layer 3 and the substrate 1, and is always in contact with the substrate 1. The urethane resin layer 4 is interposed between the chlorinated polyolefin resin layer 2 and the surface layer 3, and is always in contact with the chlorinated polyolefin resin layer 2. The urethane resin layer functions as a primer layer for improving the adhesion between the surface layer 3 of an acrylic resin or the decorative layer 5 of an acrylic resin and the chlorinated polyolefin resin layer 2.

All the layers overlying the molded substrate may be formed by coating or the like on the substrate. However, it is preferred to prepare in advance a surface cover sheet having the above surface layer as a substrate sheet and laminate the surface cover sheet onto the molded substrate, because coating steps are unnecessary and the contemplated molded product can be easily obtained. Further, in this case, decoration of the molded product with patterns, letters or the like, which is not possible with coating, can be made. The surface cover sheet may be laminated onto the surface of a preformed molded substrate, for example, by the so-called "vacuum press lamination method" as described in Japanese Patent Publication Nos. 45768/1981 and 58014/1985, wherein a surface cover sheet is placed opposite to or mounted on the surface of a molded substrate through an adhesive, and the surface cover sheet is then laminated onto the surface of the substrate by utilizing a pressure difference created by vacuum suction from the molded substrate side. This vacuum press lamination, however, requires two steps, molding step and lamination step. In contrast, lamination of a surface cover sheet simultaneously with the molding of a substrate can provide the intended product in one step, and is preferred from the viewpoint of cost. The lamination of a surface cover sheet simultaneously with the molding of a substrate may be carried out, for example, by the "simultaneous injection molding/lamination method" (see, for example, Japanese Patent Publication Nos. 19132/1975 and 27488/1968). According to this method, a surface cover sheet is placed in a cavity formed between female and male molds for injection molding, and a molten molding material is then injection filled into the cavity to simultaneously carry out the molding of a product and the bonding and lamination of the surface cover sheet onto the surface of the molded product.

The present invention will be described in more detail referring mainly to embodiments where a surface cover sheet is utilized.

[Molded substrate]

The molded substrate for use in the present invention is a molded product comprising a polyolefin resin and an ethylene-propylene rubber.

Examples of the polyolefin resin include, for example, polyethylene, polypropylene, polybutene, polymethylpentene, and ethylene-propylene-butene copolymer.

The ethylene-propylene rubber is a rubber comprising an ethylene-propylene copolymer (EPR) which is an amorphous random copolymer. Besides an ethylene-propylene bipolymer, an ethylene-propylene-diene terpolymer (EPDM) may also be used which is a terpolymer comprising ethylene and propylene as main comonomers and a minor amount of diene, such as ethylidenenorbornene, as a third comonomer. In this case, the weight ratio of the ethylene to propylene is generally about 80:20 to 20:80.

The amount of the ethylene-propylene rubber is preferably 1 to 40 parts by weight, more preferably 5 to 30 parts by weight, based on 100 parts by weight of the polyolefin resin. When the amount of the rubber is less than 1 part by weight, the effect of improving the adhesion cannot be attained. On the other hand, when the amount of the rubber exceeds 40 parts by weight, the cost is increased and, in addition, the molded substrate is soft and has unsatisfactory rigidity. Use of the rubber in an amount of not more than 30 parts by weight is preferred from the viewpoints of cost and rigidity.

If necessary, materials for the substrate may contain inorganic powders of silica, alumina, calcium carbonate, aluminum hydroxide and the like, fillers, such as glass fibers, colorants, such as pigments and dyes, stabilizers, lubricants and other conventional various additives.

[Chlorinated Polyolefin Resin Layer]

Chlorinated polyolefin resins usable herein include chlorinated polyethylene and chlorinated polypropylene. They may be used alone or as a mixture of two or more. Among them, chlorinated polypropylene is preferred because of its suitability for printing and coating and of good adhesion to the molded substrate.

Preferably, the chlorinated polyolefin resin should have a softening point of 90 to 100° C. The softening point refers to a Vicat softening temperature (JIS K 7206). When the softening point is below 90° C., the heat resistance is unsatisfactory. On the other hand, when the softening point exceeds 100° C., the adhesiveness of the hot injected resin at the time of simultaneous injection molding/lamination is unsatisfactory.

The chlorinated polyolefin resin layer may contain, in addition to the chlorinated polyolefin as a main component, auxiliary resins such as a petroleum type resin and an epoxy resin, and various additives (such as extender pigments and preservatives/stabilizers) including a hydrophobic silica which will be described later.

The petroleum type resin regulates the tack of the chlorinated polyolefin resin layer to prevent back trapping at the time of gravure coating and, in addition, regulates the heat softening properties of the layer. The petroleum type resin may be any conventional one, and examples thereof include coumarone-indene resin and petroleum resin. A thermoplastic resin obtained by cationic polymerization of a cracked oil fraction produced in petroleum cracking may be used as the petroleum resin. The amount of the petroleum resin may vary in an amount range suitable as an auxiliary resin.

The epoxy resin is a resin component for improving the heat resistance of the chlorinated polyolefin resin layer, and functions as a stabilizer which prevents the decoration sheet from being swollen by free chlorine or hydrogen chloride evolved from the chlorinated polyolefin resin upon heating. Epoxy resins usable herein include, for example, bisphenol A diglycidyl ether and epoxidized soybean oils. The amount of the epoxy resin may vary in an amount range suitable as an auxiliary resin.

The hydrophobic silica can regulate the coatability of the chlorinated polyolefin resin and prevent blocking of the formed layer. The hydrophobic silica may be any conventional one. The particle diameter of the hydrophobic silica is generally about 0.1 to 1 μm, preferably 0.2 to 0.3 μm. The amount of the hydrophobic silica to be added is generally about 1 to 10 parts by weight based on 100 parts by weight of the chlorinated polyolefin resin, though it may vary according to need.

The thickness of the chlorinated polyolefin resin layer may be properly determined according to applications. In general, however, the thickness is about 1 to 100 μm. The chlorinated polyolefin resin layer may be formed by any method without particular limitation. In general, an ink or a coating liquid comprising the chlorinated polyolefin resin diluted with a diluting solvent is applied by conventional printing or coating means, such as gravure printing or roll coating, to form the chlorinated polyolefin resin layer.

[Surface Layer of Thermoplastic Resin]

The thermoplastic resin for use in the surface layer is not particularly limited so far as the resin is thermoplastic, and may be properly selected according to applications. When the intended molded product is produced using a surface cover sheet, the surface layer of the product corresponds to the substrate sheet of the surface cover sheet. Use of a thermoplastic resin in the substrate of a surface cover sheet permits the sheet to be softened by heat applied in the production of the molded product using the surface cover sheet. This renders the sheet conformable even to a non-flat surface of a molded substrate. Thus, a surface layer can be formed on a three-dimensional molded substrate.

When the surface layer is intended for modifying the surface of a molded substrate made of a polyolefin material, the surface layer may generally be of a non-polyolefin resin. On the other hand, when there is no need for surface modification and the surface layer is intended solely for decoration with letters, patterns or the like, polyolefin resins may also be used and are rather preferred from the viewpoint of the adhesion of the surface layer to the molded substrate. According to the below-described method for producing the intended molded product using a surface cover sheet, even with resins such as a polyolefin resin which cannot successfully form a layer on a molded substrate by means of printing (or coating) of an ink (or a coating liquid), a satisfactory layer can be formed on the substrate.

Thermoplastic resins usable for the surface layer include, for example, vinyl resins, such as polyvinyl chloride, polyvinylidene chloride, vinyl chloride-vinyl acetate copolymer, polyvinyl fluoride, polyvinyl butyral, and polyvinylidene fluoride; styrene resins, such as polystyrene, acryl styrene, and ABS (acrylonitrile-butadiene-styrene copolymer); acrylic resins, such as polymethyl (meth)acrylate, polyethyl (meth)acrylate, polybutyl (meth)acrylate, methyl (meth) acrylate-butyl (meth) acrylate copolymer, methyl (meth) acrylate-2-hydroxyethyl (meth)acrylate copolymer, methyl (meth)acrylate-butyl (meth)acrylate-2-hydroxyethyl (meth) acrylate copolymer, methyl (meth) acrylate-styrene copolymer, and polyacrylonitrile ("(meth) acrylic" referring to "acrylic" or "methacrylic"); cellulosic resins, such as cellulose acetate and nitrocellulose; polyamide resins, such as nylon 6 and nylon 66; thermoplastic polyester resins, such as polyethylene terephthalate, polybutylene terephthalate, and ethylene-terephthalate-isophthalate copolymer; polycarbonate; and olefin resins, such as polyethylene, polypropylene, ethylene-propylene-butene copolymer, and olefin thermoplastic elastomers.

The surface layer may have a single layer structure or a multi-layer structure of two or more layers of different resins so far as they are thermoplastic resins. Accordingly, the surface cover sheet may be a laminate of two or more resin sheets. The thickness of the surface layer may be properly determined according to applications and purposes.

Among the thermoplastic resins, an acrylic resin is preferred from the viewpoint of scratch resistance, transparency, weathering resistance and the like. An acrylic resin is preferred also in the processability at the time of the formation of the surface layer using the surface cover sheet.

[Urethane Resin Layer]

The urethane resin layer is interposed between the surface layer of an acrylic resin or the decorative layer of an acrylic resin and the chlorinated polyolefin resin layer, and functions as an adhesive layer for further improving the adhesion between these two layers.

The urethane resin usable for the layer may be selected from two-pack curable urethane resins, one-pack, moisture-curable urethane resins, or thermoplastic urethane resins.

The two-pack curable urethane resin comprises a polyol as a main component and an isocyanate as a crosslinking (curing) agent. Polyols usable herein include those having two or more hydroxyl groups per molecule, for example, polyethylene glycol, polypropylene glycol, acrylic polyol, polyester polyol, polyether polyol, and polycarbonate polyol. Isocyanates usable herein include polyhydric isocyanates having two or more isocyanate groups per molecule, for example, aromatic isocyanates, such as 2,4-tolylene diisocyanate, xylene diisocyanate, and 4,4'-diphenylmethane diisocyanate; aliphatic (or alicyclic) isocyanates, such as hexamethylene diisocyanate, isophorone diisocyanate, hydrogenated tolylene diisocyanate, and hydrogenated diphenylmethane diisocyanate; and adducts or oligomers of the above-described various isocyanates, for example, adducts of tolylene diisocyanate and trimer of tolylene diisocyanate.

The thermoplastic urethane resin is composed of linear polymer molecules obtained by bonding a dihydric polyol to a diisocyanate through a urethane bond.

The one-pack, moisture-curable urethane resin is a composition comprising as an essential component a prepolymer having isocyanate groups at the molecular ends. The prepolymer is generally a polyisocyanate prepolymer having one or more isocyanate groups at each of the molecular ends, which is solid and thermoplastic at room temperature. The isocyanate end groups react with each other upon exposure to moisture in the air to cause a chain extension reaction which produces a reaction product having a urea bond in the molecular chain. Further, other isocyanate end groups react with the urea bond to produce a biuret bond, thus causing branching or crosslinking.

The molecular chain structure of the prepolymer having isocyanate end groups is not particularly limited. Specific examples include a polyurethane structure having a urethane bond, a polyester structure having an ester bond, and a polybutadiene structure. One or two or more of suitable structures may be adopted. When there is a urethane bond in the molecular chain, isocyanate end groups react also with the urethane bond to produce an allophanate bond, which also causes crosslinking.

[Decorative Layer]

The decorative layer may be formed with a printing ink or a coating composition. Alternatively, a metallic thin film or the like may be used as the decorative layer. When a surface cover sheet is used to produce the intended molded product, the decorative layer may be formed on the substrate sheet that becomes the surface layer of the final product. When the decorative layer is formed using a printing ink or a coating composition, any conventional colorant may be used in the coating material. Examples of colorants include: inorganic pigments, such as titanium white, carbon black, iron oxide red, chrome yellow, and cobalt blue; organic pigments, such as aniline black, phthalocyanine blue, isoindolinone, and quinacridone; metal pigments, such as aluminum flake or powder; nacreous pigments; and dyes. Binders for printing inks (or coating compositions) include chlorinated polyolefins, such as chlorinated polyethylene and chlorinated polypropylene, polyester resin, urethane resin, acrylic resin, vinyl acetate resin, vinyl chloride-vinyl acetate copolymer, and cellulosic resins. When the surface layer is formed of an acrylic resin, the use of an acrylic resin also for the decorative layer is preferred from the viewpoint of adhesion between the layers.

Patterns for the decorative layer include woodgrain patterns, marble grain patterns, cloth patterns, grain leather patterns, geometrical patterns, characters, symbols, and solid prints.

[Surface Cover Sheet]

Regarding the surface cover sheet to be used in the simultaneous molding/lamination, for the molded product M shown in FIG. 1, a surface cover sheet having a two-layer structure may be used which consists of a surface layer 3 and a chlorinated polyolefin resin layer 2 as a backside layer. In the surface cover sheet, the surface layer 3 of a thermoplastic resin serves as the substrate sheet. The surface cover sheet may be laminated onto a molded substrate 1 such that the chlorinated polyolefin resin layer 2 as the backside layer comes into contact with the molded substrate.

For the molded product M shown in FIG. 2, a surface cover sheet having a three-layer structure may be used which consists of a surface layer 3 as the substrate sheet and a urethane resin layer 4 and a chlorinated polyolefin resin layer 2 laminated in that order onto the surface layer 3. For the molded product M shown in FIG. 3, a surface cover sheet having a four-layer structure may be used which consists of a surface layer 3 as the substrate sheet and a decorative layer 5, a urethane resin layer 4, and a chlorinated polyolefin resin layer 2 laminated in that order onto the surface layer 3.

When a pattern is formed with the decorative layer, the layer may be formed by a conventional printing method, such as gravure printing or gravure offset printing. On the other hand, the decorative layer not of a pattern layer but of a solid layer, the chlorinated polyolefin resin layer and the urethane resin layer may be formed either by printing or by a conventional coating method, such as gravure coating.

A colorant as described above in connection with the decorative layer may be added in the surface layer to make the surface layer to a colored transparent layer or a colored opaque layer (in the case where the decorative layer is not provided). The surface cover sheet in this case or in the case where the decorative layer is provided therein can be regarded as a decorative sheet. For example, the surface cover sheet. used in the molded product M of FIG. 2, in which the decorative layer 5 is absent, may be regarded as a decorative sheet when the surface layer 3 is colored for decoration. It is a matter of course that, in the molded product of FIG. 2, the surface layer may not be colored for decoration purposes and may be provided for the purpose of surface modification only, e.g. for improving the scratch resistance.

The surface cover sheet according to the present invention is suitable for the covering of the surface of the molded substrate comprising a polyolefin resin and an ethylene-propylene rubber. However, the surface cover sheet may also be applied to a molded substrate composed of other materials (for example, polyolefin resin alone or urethane resin), so far as a desired adhesion can be attained.

[Production of Molded Product]

Next, the production of the molded product according to the present invention by simultaneous injection molding/lamination will be described with reference to FIG. 4. Herein illustrated is a manner in which a surface cover sheet is heat-softened between molds and then preformed, followed by mold clamping and injection of the resin.

Figure 4A:
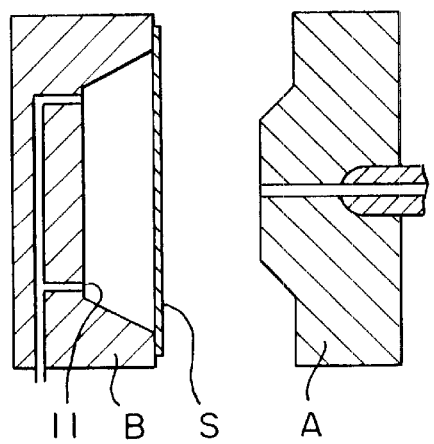
FIG. 4 is a conceptual schematic diagram showing one embodiment of a method for producing the molded product according to the present invention, wherein a surface cover sheet is laminated onto a molded substrate by a simultaneous injection molding/lamination method.
Figure 4B:
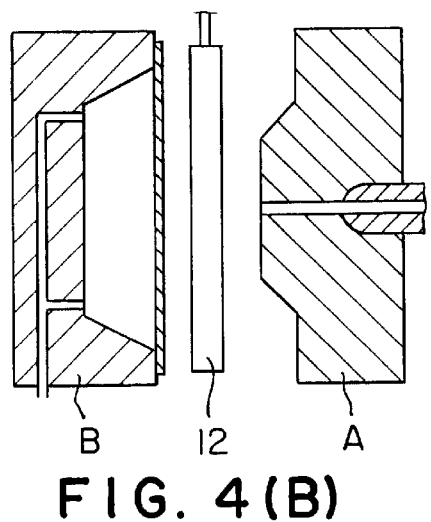
Figure 4C:
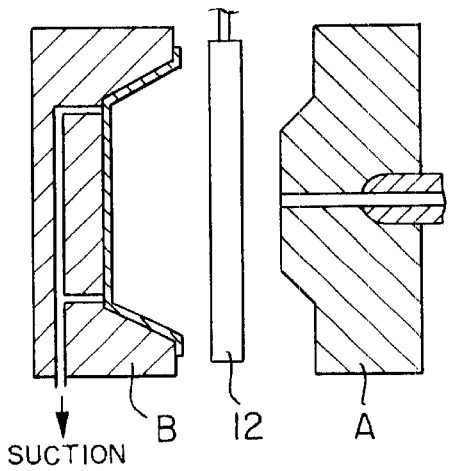
Figure 4D:
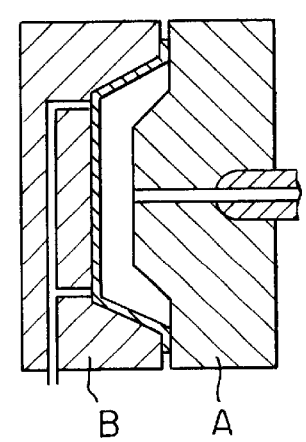
Figure 4E:
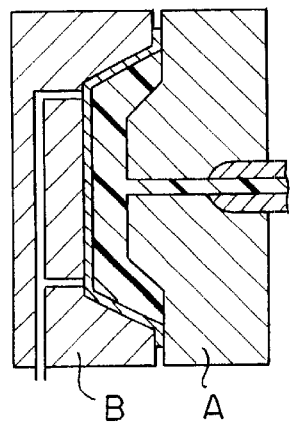
Figure 4F:
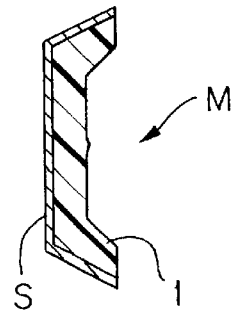

At the outset, an injection mold as shown in FIG. 4(A) is provided, comprising a pair of molds, a mold A having a runner and a gate communicating with an injection nozzle and a mold B having a suction hole 11 on its surface and serving also as a mold for preforming of a surface cover sheet. In the opened state of the mold, a surface cover sheet S is fixed on the mold B, for example by pressing the sheet by means of a clamp in a frame form (not shown) . Next, as shown in FIG. 4(B), the surface cover sheet is heat-softened by means of a heater 12 (though non-contact radiation heating is employed in FIG. 4(B), contact heating may also be employed) . Thereafter, as shown in FIG. 4(C), suction is applied through the suction hole to perform vacuum forming. Thus, the surface cover sheet is preformed along the surface of the mold B. The vacuum forming may be a vacuum/air-pressure forming which also utilizes air-pressure. Thereafter, the both molds are clamped as shown in FIG. 4(D), and, as shown in FIG. 4(E), a heat-melted material for a molded substrate is then injected into the cavity defined by the both molds. After the solidification of the liquid material, the mold is opened, and the molded product is taken out of the mold. When there is an extra portion of the surface cover sheet in the product, the portion may be trimmed off. The molded product M of the present invention as shown in FIG. 4(F), comprising a surface cover sheet S laminated onto a molded substrate 1 is thus obtained.

Depending upon the shape of a surface on which a surface cover sheet is to be laminated, for example, when the draw depth of the surface cover sheet is small, lamination of the surface cover sheet may be performed, without conducting the above preforming, by utilizing a pressure of the liquid material for the substrate which is injection-filled into the mold. This applies to the case where the surface to be laminated is plane or two-dimensionally curved. In this case, the surface cover sheet may be fixed onto the surface of the female mold by means of static electricity or the like, followed by mold clamping and injection of the resin.

In the above described simultaneous molding/lamination process, previously imparting a concave-convex pattern, such as grain pattern or vessel pattern, to the surface of the female mold can provide a molded product having the concave-convex pattern on the surface layer.

The following examples and comparative examples further illustrate the present invention.

EXAMPLE 1

A molded product having a layer construction as shown in FIG. 3 was produced by a simultaneous injection molding/lamination method wherein injection molding of a molded substrate and lamination of a surface cover sheet onto the molded substrate were simultaneously carried out.

(Surface cover sheet)

A decorative layer, a urethane resin layer, and a chlorinated polyolefin resin layer were gravure printed in that order on one side of a 125 μm-thick transparent acrylic resin film of a methyl methacrylate-butyl methacrylate copolymer to provide a surface cover sheet (a decorative sheet). The decorative layer was formed by printing a woodgrain pattern using a combination of inks of three colors comprising coloring pigments, such as iron oxide red, added to a binder of acrylic resin. The urethane resin layer was formed using a thermoplastic urethane resin to a thickness of 1 μm, and the chlorinated polyolefin resin layer was formed to a thickness of 2 μm.

(Production of Molded Product)

An injection mold for console panels to be used in the interior of automobiles was provided as a mold. As shown in FIG. 4(A), a suction hole for preforming of the sheet is provided on the female mold side.

A mixture of 100 parts by weight of a polypropylene resin with 10 parts by weight of an ethylene-propylene rubber (EPR) was provided as a material for a molded substrate.

At the outset, in the opened state of the mold, the above surface cover sheet was fixed onto the parting face of the female mold which has a suction hole and serves also as a vacuum forming mold. More specifically, the sheet was fixed in the peripheral portion of the parting face of the female mold by pressing the sheet against the parting face by means of a sheet clamp in a picture frame form. Thereafter, a ceramic panel heater having a surface temperature of 330° C. was advanced from a refuge position, in the outside of the mold, toward a position between the female and male molds. The surface cover sheet was heat-softened by the non-contact radiation heating. Vacuum forming was then carried out using the female mold as the vacuum forming mold to allow the surface cover sheet to conform to the shape of the cavity face of the female mold. Preforming of the sheet was thus conducted. After the heater was retreated, the both molds were clamped. The above-described material for a molded substrate, in the heat-melted state, was then injected into the cavity defined by the both molds. After the liquid material was cooled and solidified, the molds were opened to take out a molded product according to the present invention in which the surface cover sheet was laminated onto the molded substrate.

COMPARATIVE EXAMPLE 1

A molded product was prepared in the same manner as in Example 1, except that the polypropylene resin alone, i.e. not mixed with the EPR, was used instead of the injection material of Example 1.

[Comparison in Performance]

For the molded products obtained in Example 1 and Comparative Example 1, the adhesion of the surface cover sheet to the molded substrate was evaluated and compared. Specifically, a cellophane pressure-sensitive adhesive tape ("Cello-Tape" (registered trademark) manufactured by Nichiban Co., Ltd., width 24 mm, for industrial applications) was applied at 25° C. onto the surface of the molded product, then forcefully peeled off to examine whether or not the surface cover sheet was separated together with the tape. As a result, for the comparative molded product, the surface cover sheet was separated together with the tape. In contrast, for the molded product of the present invention, the surface cover sheet was not separated together with the tape, thus indicating a good adhesion of the sheet to the molded substrate. The molded product was decorated with a woodgrain pattern, and, by virtue of the acrylic resin constituting the surface layer, had a well transparent coating appearance and further had an improved scratch resistance, indicating a satisfactory surface modification effect.

INDUSTRIAL APPLICABILITY

The molded product of the present invention may be used in various applications. They are particularly useful for automobile interior members, such as console panels and instrument panels, automobile exterior members, such as door mirrors, bumpers, and side moldings, and exterior surface materials of domestic electric appliances including air conditioners and telephones, and cabinets for business equipments.

What is claimed is:

1. A molded product comprising:

a molded substrate comprising a polyolefin resin and an ethylene-propylene rubber;

a chlorinated polyolefin resin layer laminated onto the molded substrate, the chlorinated polyolefin resin layer being in contact with the molded substrate; and a surface layer of a thermoplastic acrylic resin laminated as an outermost layer onto the chlorinated polyolefin resin layer through urethane resin layer(s), said thermoplastic acrylic resin selected from the group consisting of polymethyl(meth)acrylate, polyethyl(meth)acrylate, polybutyl(meth)acrylate, methyl(meth)acrylate-butyl(meth)acrylate copolymer, methyl(meth)acrylate-2-hydroxylethyl(meth)acrylate copolymer, methyl(meth)acrylate-butyl(meth)acrylate-2-hydroxyethyl (meth)acrylate copolymer, methyl(meth)acrylate-styrene copolymer, and a mixture thereof.

2. The molded product according to claim 1 wherein the chlorinated polyolefin resin has a softening point of 90 to 100° C.

3. The molded product according to claim 1, wherein the chlorinated polyolefin resin layer further comprises a petroleum resin, an epoxy resin or hydrophobic silica particles.

4. A surface cover sheet for a molded product comprising a polyolefin resin and an ethylene-propylene rubber, said surface cover sheet comprising: a surface layer comprising an acrylic resin; a urethane resin layer laminated onto the backside of the surface layer; and a chlorinated polyolefin resin layer laminated onto the backside of the urethane resin layer, wherein said acrylic resin is selected from the group consisting of polymethyl(meth)acrylate, polyethyl(meth)acrylate, polybutyl(meth)acrylate, methyl(meth)acrylate-butyl(meth)acrylate copolymer, methyl(meth)acrylate-2-hydroxylethyl(meth)acrylate copolymer, methyl(meth)acrylate-butyl(meth)acrylate-2-hydroxyethyl (meth)acrylate copolymer, methyl(meth)acrylate-styrene copolymer, and a mixture thereof.

* * * * *